Dec. 18, 1923.  
D. W. SLATTERY  
VALVE  
Filed Dec. 6, 1919  
1,477,722  
2 Sheets-Sheet 1
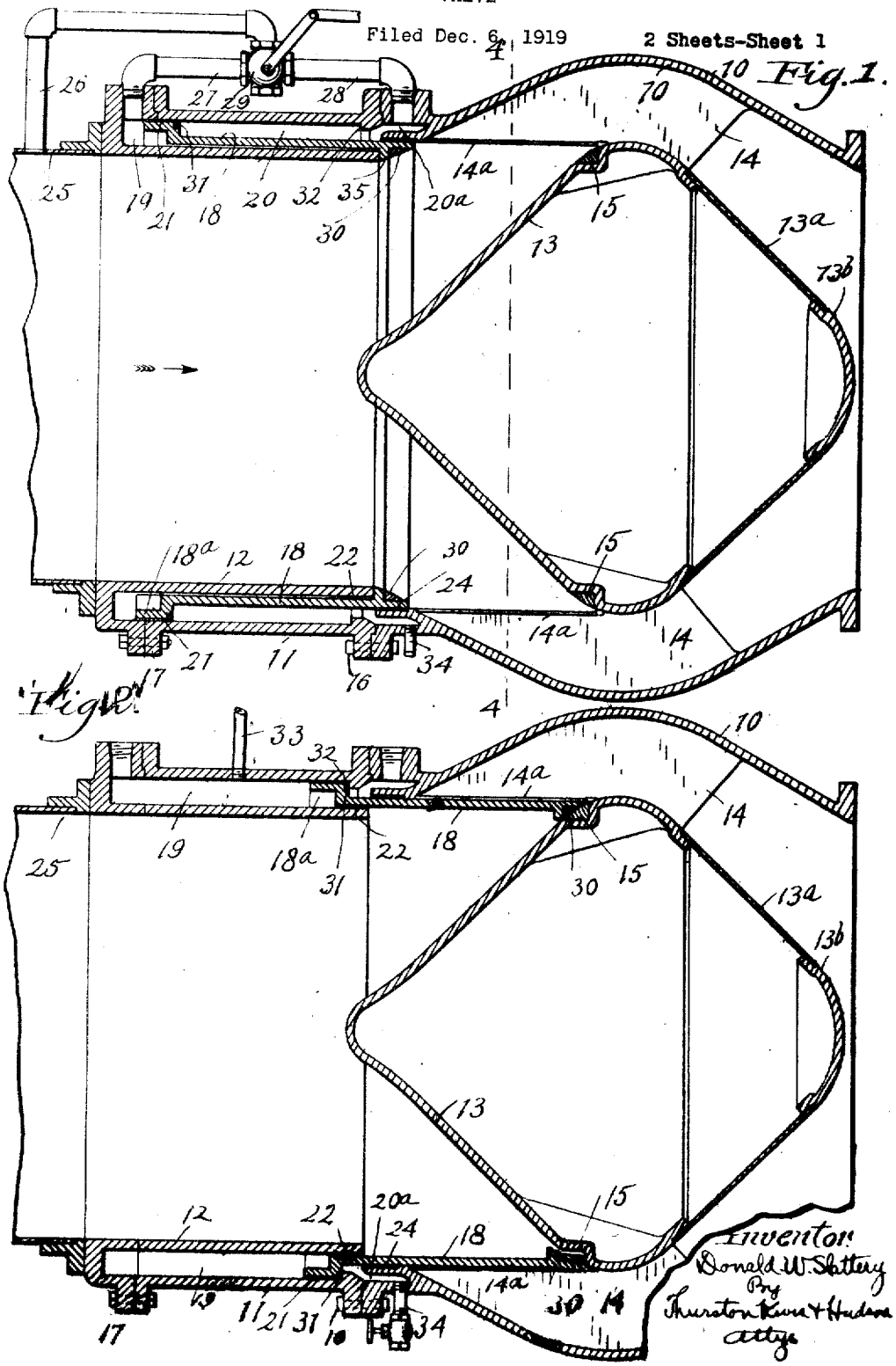

Dec. 18, 1923.   1,477,722
D. W. SLATTERY
VALVE
Filed Dec. 6, 1919   2 Sheets-Sheet 2
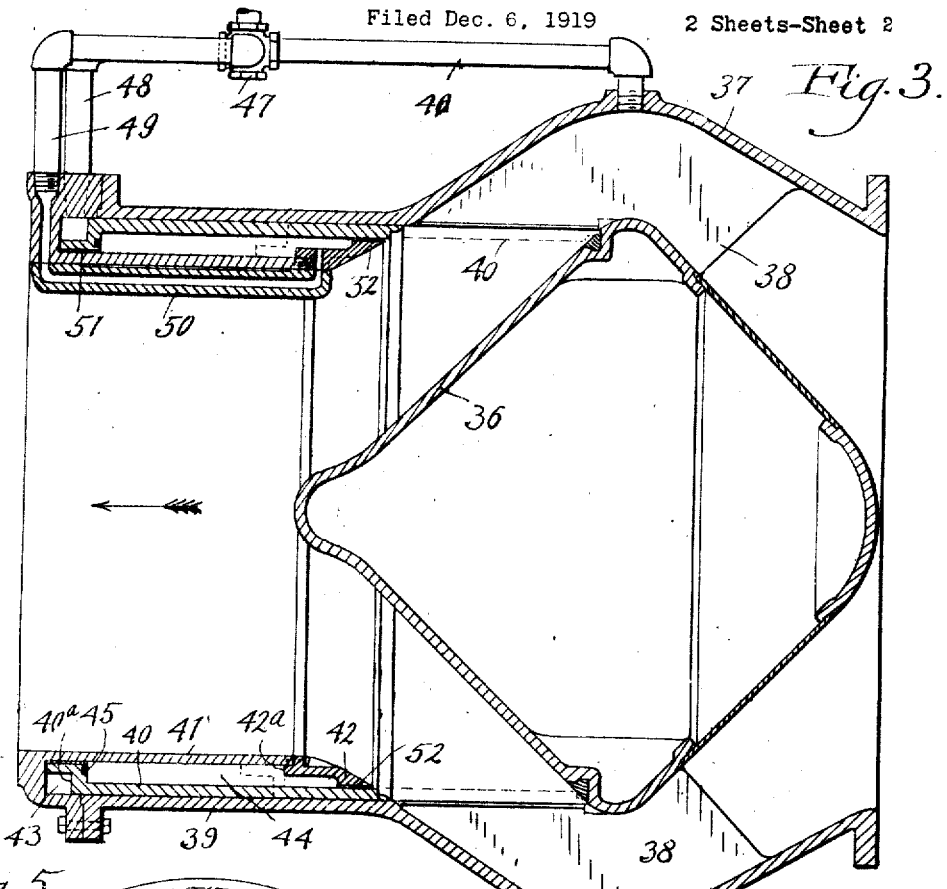
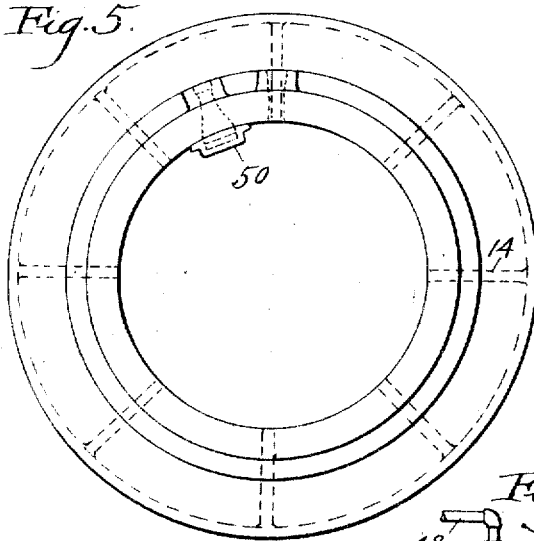
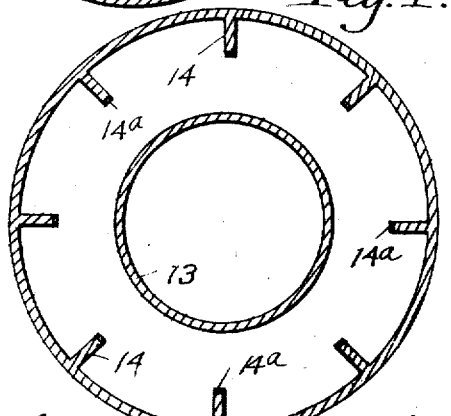
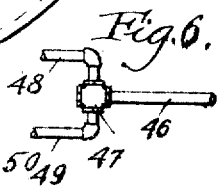

Patented Dec. 18, 1923.

1,477,722

UNITED STATES PATENT OFFICE.

DONALD W. SLATTERY, OF EAST CLEVELAND, OHIO, ASSIGNOR TO THE WELLMAN-SEAVER-MORGAN COMPANY, OF CLEVELAND, OHIO, A CORPORATION OF OHIO.

VALVE.

Application filed December 6, 1919. Serial No. 342,886.

*To all whom it may concern:*

Be it known that I, DONALD W. SLATTERY, a citizen of the United States, residing at East Cleveland, in the county of Cuyahoga and State of Ohio, have invented a certain new and useful Improvement in Valves, of which the following is a full, clear, and exact description.

This invention relates to valves, and has particular reference to hydraulic valves in varying sizes up to the largest which may be employed in the penstocks of large water turbine installations.

Among the chief objects are to provide a valve which can be constructed, assembled and installed inexpensively, which can be opened and closed smoothly and quickly by fluid pressure remotely controlled if desired, which when closed is tight, irrespective of the fluid pressure, and when open permits a smooth flow of water, and which can be safely constructed in large sizes for operation under a very high head, or in small sizes for operation under comparatively low head.

The above and other more specific or minor objects are obtained by my invention which may be briefly summarized as consisting in certain novel details of construction, and combinations and arrangements of parts which will be described in the specification and set forth in the appended claims.

In the accompanying sheets of drawings wherein I have shown two slightly different forms of my invention, one adapted for flow in one direction, and the other adapted for flow in the reverse direction, Fig. 1 is a sectional view through the valve with the direction of flow from left to right, the valve being open; Fig. 2 is a similar view with the valve closed; Fig. 3 is a similar view for flow from right to left; Fig. 4 is a sectional view on a reduced scale substantially along the line 4—4 of Fig. 1; Fig. 5 is an end view looking toward the right of Fig. 3; and Fig. 6 is a detail of the control piping for the valve shown in Figs. 3 and 5.

Referring now to the drawings, and first to Figs. 1, 2 and 4, the valve comprises a valve body which in this instance is composed of three parts, 10, 11 and 12, the parts 11 and 12 being at the inlet end. The direction of flow for this valve is indicated by the arrow on Fig. 1, and for convenience of description, the fluid will be assumed to be water.

The body member 10 is enlarged between its ends to accommodate without restriction of flow, an inner stationary shell 13, which may be termed the seat member. The body member 10 which is preferably an iron or steel casting, has all or part of the shell 13 cast integral with it, to which it is connected by radial ribs 14. In this instance the seat member 13 is composed of a main portion facing the inlet end and connected to the body member 10 by the ribs, and cast integral therewith as before stated, and a separately formed portion composed of a steel plate 13ª and a cast metal tip 13ᵇ. As before stated, the seat member or shell may be cast in one integral piece, and it is made hollow simply for the sake of lightness. It is shaped with tapered or conical forward and rear ends so as to permit a smooth flow of water when the valve is open, it being understood that the water coming from the inlet end is divided by the tapered nose of the valve and flows around the same between the radial ribs 14 and out through the outlet end of the body. In this instance the inlet and outlet ends of the body are of the same diameter, and the construction is such that the capacity at the largest part of the body member 10 is as great, and possibly slightly greater than at either end.

On the inner shell 13 is a seat ring 15, which may be simply a machined surface, or a separate ring such as a bronze ring set into a machined groove of the shell.

The ribs 14 not only serve to sustain the central shell 13, but they are extended axially toward what may be termed the neck of the valve, the inner surfaces of the extended portions of the ribs being horizontal or parallel with the axis and being preferably faced with brass or bronze liners 14ª constituting bearing surfaces for the valve proper when in closed position and when it is being moved to and from closed position.

The valve member 11 is rigidly secured by bolts or equivalent means 16 to the adjacent end of the body member 10, and the body member 12 which for the most part is concentric with respect to, and is inside the member 11, is bolted to the latter by bolts or equivalent means 17 passing through external flanges of the two parts. The two body members 11 and 12 are spaced apart, forming an annular space closed at the inlet end of the valve body and open at its opposite end. This annular space between the two body members 11 and 12 receives a valve ring or valve proper 18.

At its end which is adjacent the closed end of the annular space referred to, this valve ring has an enlargement 18ª which divides the annular space into what may be termed differential chambers 19 and 20. The periphery of the enlarged part 18ª of the valve rings carries a brass or bronze liner 21 which engages the outer wall of the valve receiving space between the two members 11 and 12, and at the open end of this annular space, and secured to the inner body member 12 is a brass liner 22 over which the inner surface of the valve slides while being opened and closed. It might be mentioned that a section of the differential chamber 20 extends into the adjacent end of the body member 10, this section being designated 20ª. This extension 20ª of the differential chamber 20 is formed between two concentric flanges on the end of the body member 10, the inner one having a brass or bronze liner 24 on its inner surface, this liner forming a bearing for the outer surface of the valve while the liner 21 carried by the enlarged part of the valve bears on the wall of the outer body member 11. Furthermore, when the valve is closed, or partly closed, it engages the liners or bearing strips 14ª on the ribs 14, these liners 14ª forming spaced or separated portions of an imaginary cylindrical surface virtually a continuation of the liner 24.

The valve is operated by fluid pressure supplied and relieved or exhausted by suitable control piping and one or more control valves. For this purpose pressure may be taken from any suitable source, i. e. from the penstock or pipe line adjoining the valve, or from an outside source. In this instance, the pressure is taken from the pipe line 25, which is connected to the inlet end of the valve body, by means of a pipe 26 and branch pipes 27 and 28, one leading to the differential pressure chamber 19, and the other to the extension 20ª of differential chamber 20. Between the supply pipe 26 and the branch pipes 27 and 28 is a four-way valve 29 which can be turned so as to shut off the pressure from both pipes 27 and 28, or supply pressure by pipe 27 to chamber 19 and at the same time exhaust it from chamber 20, or supply pressure to chamber 20 and at the same time exhaust it from chamber 19. It will be understood of course, that in place of the four-way cock, any suitable valve mechanism may be used which can be operated to introduce pressure to one chamber and exhaust it from the other, and such valve or valves may be remotely controlled if desired.

To close the valve by the movement of the valve ring 18, pressure is admitted to chamber 19 and exhausted from 20. This shifts the valve ring until a seat 30 at the forward end thereof engages the seat 15 of the seat member 13. The seat 30 carried by the valve may be a machined ring set into a groove at the forward end of the valve ring, or it may be a machined surface forming an integral part of the valve ring. When the valve ring is thus moved into engagement with the seat member 13, the flow of fluid through the valve is stopped.

When the valve ring engages the seat member, suitable packing 31 on the forward side of the enlarged or piston portion 18ª of the valve ring engages an internal shoulder 32 on the annular body member 11, preventing fluid passing from chamber 19 to 20.

When the valve is closed as just explained, the four-way cock 29 may be returned to neutral position, (that is, so as to shut off pressure from both chambers) but the valve ring 18 will be held firmly in closed position, by pressure from the penstock entering chamber 19 past the liner 22. If desired, a pipe 33 connected with the supply line may introduce constant pressure to chamber 18. This pipe will be much smaller in capacity than the main control piping, and would therefore not interfere with the opening operation of the valve. It will be noted also, that when the valve is closed, pressure cannot build up in chamber 20 by any fluid which may leak by the packing ring 31 since it will pass from this chamber past the liner 24 into the forward section of the valve. This leakage will, however, be very small, and if a practically dry condition is wanted beyond the valve, this leakage may be carried outside of the valve by a small drain 34, as shown.

The valve is opened by operating the four-way cock or control valve to admit pressure to chamber 20 and exhaust it from chamber 19, the valve ring then moving to the open position shown in Fig. 1, a shoulder in the form of an internal flange 35 at the forward end of the valve ring then engaging the forward end of the body member 12. It will be observed that when the valve is full open, as shown in Fig. 1, neither the forward end of the valve nor the seat member interferes with the smooth flow of water through the valve body, but smooth inner and outer surfaces are provided.

When the valve is opened in the manner just stated, the control valve may then be returned to neutral position. When the valve is in this position pressure may build up by leakage from the penstock past the liner 21, and past the liner 22 into both chambers, but there will be equal forces on both sides of the piston portion of the valve ring, and the balanced condition will hold the ring in its open position. To insure this balanced condition, the drain 34 should be closed. The returning of the control valve to neutral position as noted above, is not necessary though it would be desirable in the event there is used an electrically operated remote control valve.

In Figs. 3 and 5 is shown a valve which may be employed advantageously when the direction of flow through the valve body is the reverse of that for which the valve of Figs. 1 and 2 is best adapted. The design shown in Figs. 1 and 2 is most effective when the movable parts, i. e. the movable valve ring is on the up-stream end of the valve body, and the valve of Figs. 1 and 2 could be employed when the direction of flow is the reverse of that indicated in Fig. 1, simply by turning the valve end for end, in which event the movable parts would still be on the up-stream end of the valve body. However, it is sometimes the case, particularly in large installations, that it is desired that the down-stream or outlet end of the valve body be smaller in diameter than the up-stream end, and while it is possible to make the inlet or up-stream end of the valve of Figs. 1 and 2 larger than the outlet or down-stream end, nevertheless it would be cheaper to have the movable parts at the smaller end of the valve body, and therefore at the down-stream end. It is largely for that reason that the construction shown in Figs. 3 and 5 is provided. The construction of Fig. 3 differs from that first described chiefly in the arrangement of the pressure chambers by which the valve ring is operated, the principle of operation being the same. This valve has an inner seat member 36 connected to the body 37 of the valve by radial ribs 38 as in the first instance, but in this case the enlarged body portion of the valve has an integral extension or neck 39 disposed axially in the direction of flow from the seat member and forming the outer wall of the annular space or chamber receiving the ring valve 40. The inner wall of this space is in this instance, for convenience of construction and assembly, composed of two members 41 and 42 which are secured together.

It will be observed that in this instance the main or body portion of the valve ring 40 engages the outer wall or neck 39 of the valve body, and that the end of the valve ring has a reduced part 40ª constituting the piston portion which divides the annular space referred to into the two pressure chambers 43 and 44, which chambers are reversely arranged with respect to those of the construction first described, the arrangement being such that when the valve is closed, pressure may by leakage from the inlet side of the valve body enter the pressure chamber 43 and hold the valve closed, though pressure will not pass from this chamber to the pressure chamber 44 for the reason that the reduced or piston portion 40ª of the valve carries packing 45 which when the valve is closed, engages a shoulder 42ª of the member 42, and this effectively prevents pressure building up in chamber 44.

The valve is controlled by fluid pressure through the medium of a supply pipe 46 which in this instance (though not necessarily) is connected to the body of the valve, and by a four-way cock 47 and branch pipes 48 and 49 connected respectively to the two pressure chambers 43 and 44, the connection of the latter chamber being accomplished by a casting 50 in the water-way or neck of the valve, though a pipe could be employed for this purpose.

When pressure is admitted to chamber 43 and exhausted from chamber 44, the valve is moved out of the mouth or open end of the annular space receiving the valve over into engagement with the valve seat, and in so doing, sliding over the liners of the ribs 38. It might be mentioned at this point that the reduced or piston portion 40ª of the valve is preferably provided with a liner 51 which engages the valve body member 41, and the valve body member 42 is preferably provided with a liner 32 over which the valve slides.

When the valve is in full closed position the control valve 47 may be moved to neutral position since pressure is maintained in chamber 43 by leakage from the inlet side of the valve body.

To open the valve, pressure is admitted to the chamber 44 and exhausted from 43, after which the control valve may be moved to neutral position, pressure being then built up by leakage in both chambers which maintains a balanced condition.

The valve of Figs. 1 and 2, or of Fig. 3 may be placed horizontally, vertically, or at any angle, regardless of the position, the operation being the same as that already described, though when the valve of Fig. 3 is arranged vertically, and the direction of flow is downward, the control valve is preferably not returned to neutral when the valve is closed.

Having described my invention, I claim:

1. A valve comprising a valve body or casing having a centrally disposed stationary seat member around which fluid may flow when the valve is open, said member having an outer valve seating portion a valve ring concentric with the valve body axis, said valve ring being positioned at one side of the valve seating portion of the stationary member and movable lengthwise of the latter into and out of engagement with the seat member, a chamber receiving said valve ring and formed by said ring into oppositely acting pressure chambers.

2. A valve comprising a valve body having an enlarged portion, a stationary seat member located within the enlarged portion and connected to the latter so that when the valve is open fluid may flow around the seat member, said member having an outer valve seating portion a valve ring carried by a portion of the valve body and positioned at one side of the valve seating portion of the stationary member, said body having bearing surfaces over which the ring slides in moving toward and from the seat member, said valve ring forming in said portion of the valve body opposed pressure chambers.

3. A valve comprising a valve body, a seat member located centrally in a portion of the valve body, ribs connecting the valve body to the seat member forming passages around the seat member, and a movable valve member in the form of a ring centrally disposed with respect to the axis of the valve body axially of the seat member, means receiving said ring, and means for causing the ring to be moved toward and from the said member comprising opposed pressure chambers formed by said ring in the ring receiving means, said ribs having portions forming bearings for the valve ring.

4. A valve comprising a valve body with a centrally disposed stationary seat member and said body having axially of the seat member a hollow portion closed at one end and having a restricted annular opening at its opposite end, and a valve ring therein fitting in the restricted opening and having an enlarged portion within the hollow portion forming differential pressure chambers for the admission and exhaust of fluid to shift the ring toward and from the se member.

5. valve comprising a valve body with an inner stationary seat member around which fluid may flow when the valve is open, and said body having axially of the seat member inner and outer walls forming an annular space concentric with the axis of the valve body and open toward the seat member, a valve ring in said annular space forming two chambers to which fluid may be supplied or from which it may be exhausted to cause the valve ring to be moved toward and from the seat member.

6. In a valve, a valve body having an enlarged portion containing an inner seat member with spacing ribs between the seat member and body, and said body having an annular chamber open toward the seat member, an annular movable valve in said chamber having a portion adapted to slide over said ribs into and out of engagement with the seat member and having a portion in said chamber constituting a piston dividing the chamber into separate fluid receiving portions.

In testimony whereof, I hereunto affix my signature.

DONALD W. SLATTERY.